United States Patent [19]

Henzi et al.

[11] Patent Number: 4,751,522
[45] Date of Patent: Jun. 14, 1988

[54] PHOTOPLOTTER MOUNTING HEAD ASSEMBLY

[76] Inventors: Max P. Henzi, 5706 Lewis Way, Concord, Calif. 94521; E. Thomas Luoma, 1555 Pleasant Hill Rd., Lafayette, Calif. 94549

[21] Appl. No.: 17,502

[22] Filed: Feb. 24, 1987

[51] Int. Cl.$^4$ .............................................. G01D 9/42
[52] U.S. Cl. .................................... 346/107 R; 354/4; 346/139 R
[58] Field of Search ........... 346/107, 108, 160, 139 R; 354/4, 5

[56] References Cited

U.S. PATENT DOCUMENTS 4,030,122  6/1977  Chemelli ........................ 346/76 L
4,096,486  6/1978  Pfeifer ............................ 346/107 R
4,532,526  7/1985  Behrens .......................... 346/107 R Primary Examiner—H. Broome
Assistant Examiner—Mark Reinhart
Attorney, Agent, or Firm—Townsend and Townsend

[57] ABSTRACT

A computer controlled photoplotter includes a row of LED's mounted to a light head positioned parallel to the film width. The light head is part of a light head assembly which is moved parallel to the film length. At the end of each pass the light head is indexed widthwise a short distance. During each lengthwise pass the LED's are illuminated at appropriate positions to expose the film at those positions according to the image being plotted. The light head uses cylindrical lenses in which the index of refraction varies radially. The lenses are secured within the bores in the light head by resilient, cushioned material biased against the sides of the lenses through the slot opening into the sides of the bores.

10 Claims, 6 Drawing Sheets

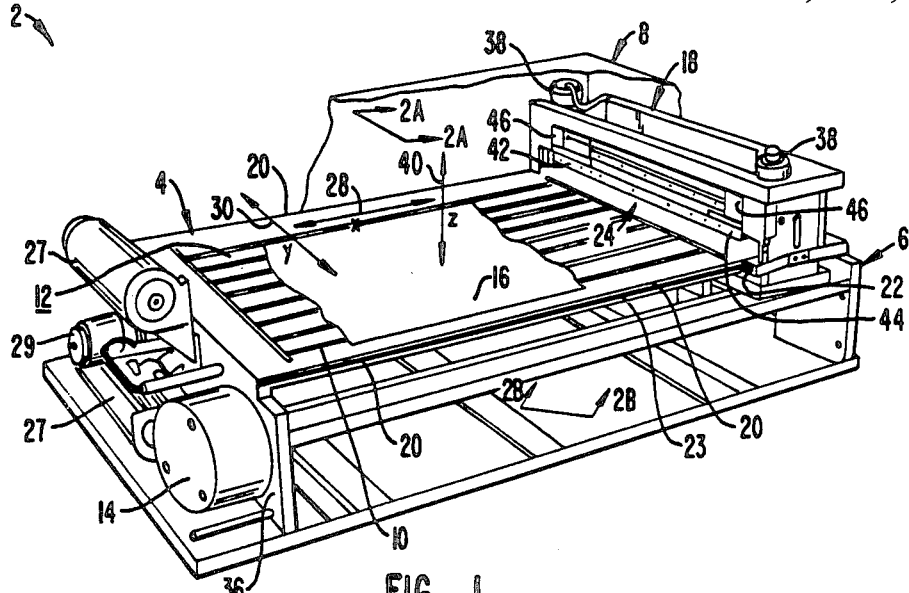
FIG._1.
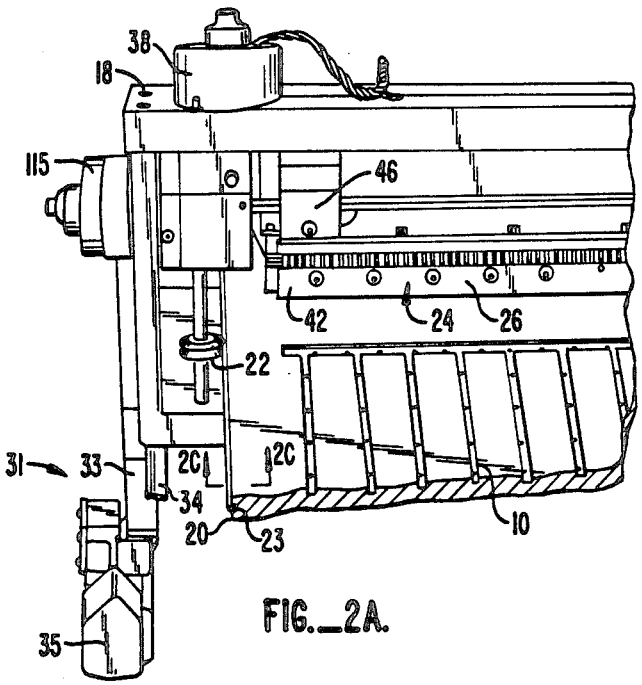
FIG._2A.
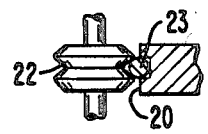
FIG._2C.

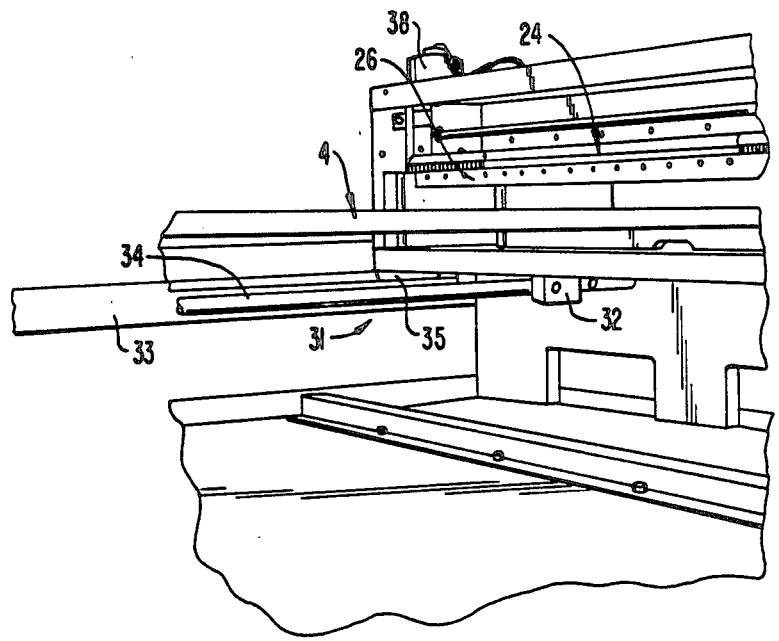
FIG._2B.
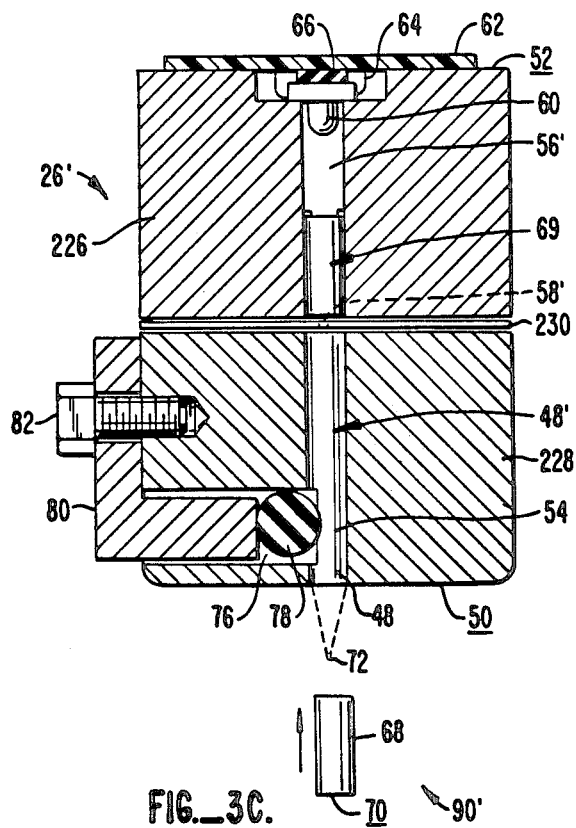
FIG._3C.

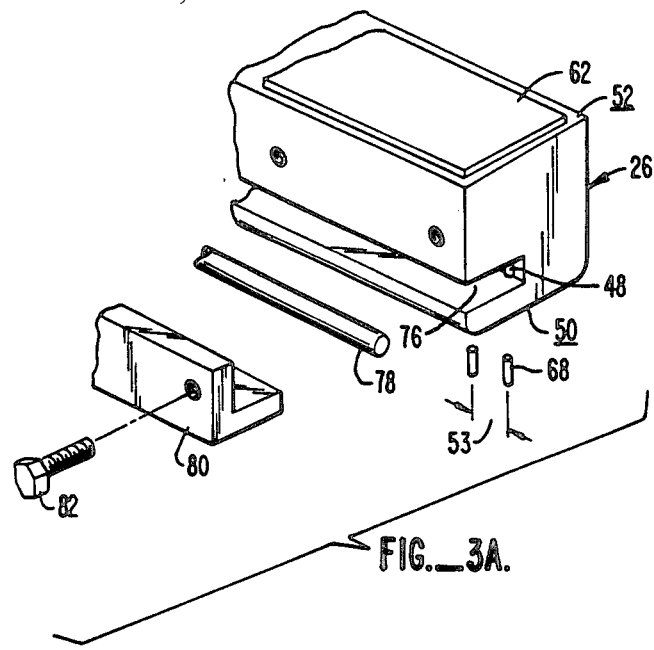
FIG._3A.
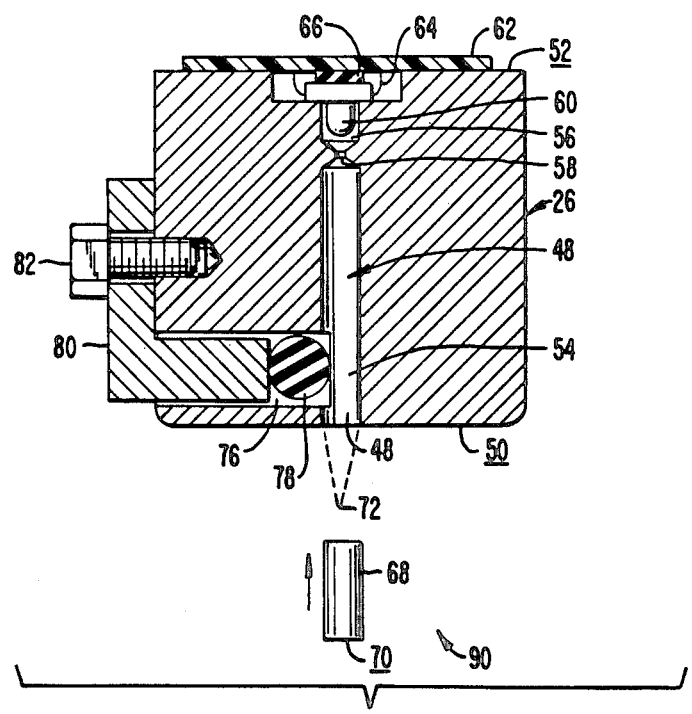
FIG._3B.

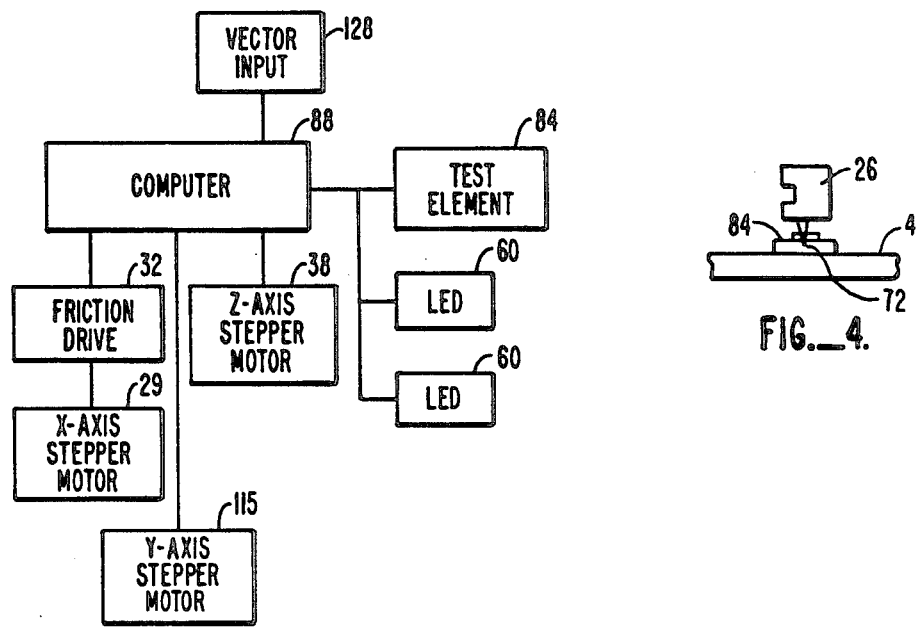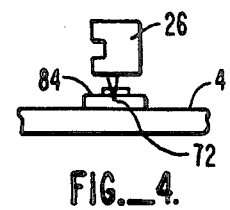
FIG._4.
FIG._5.
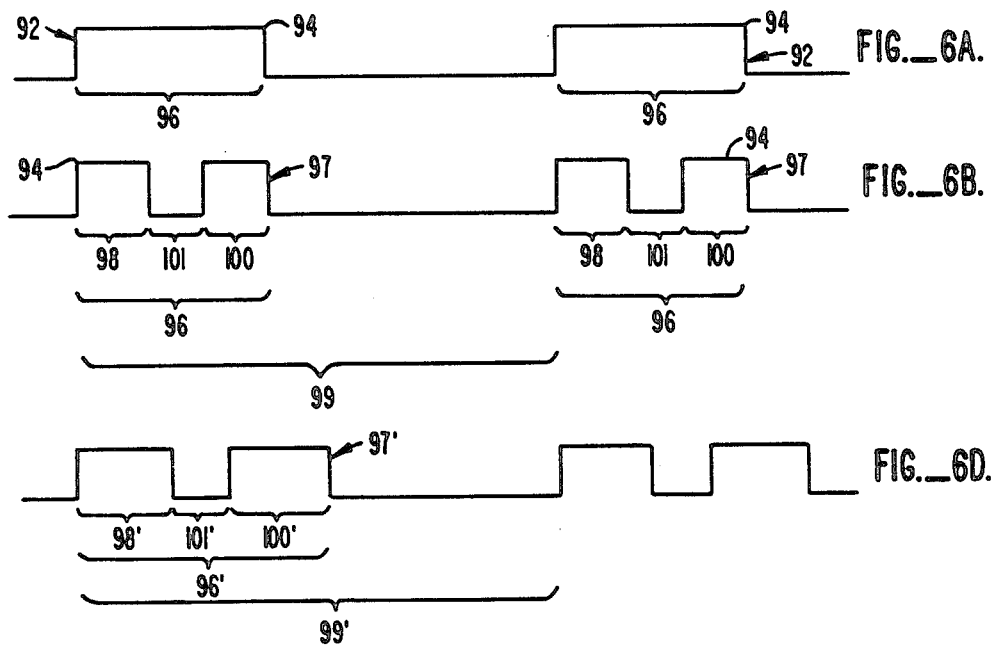

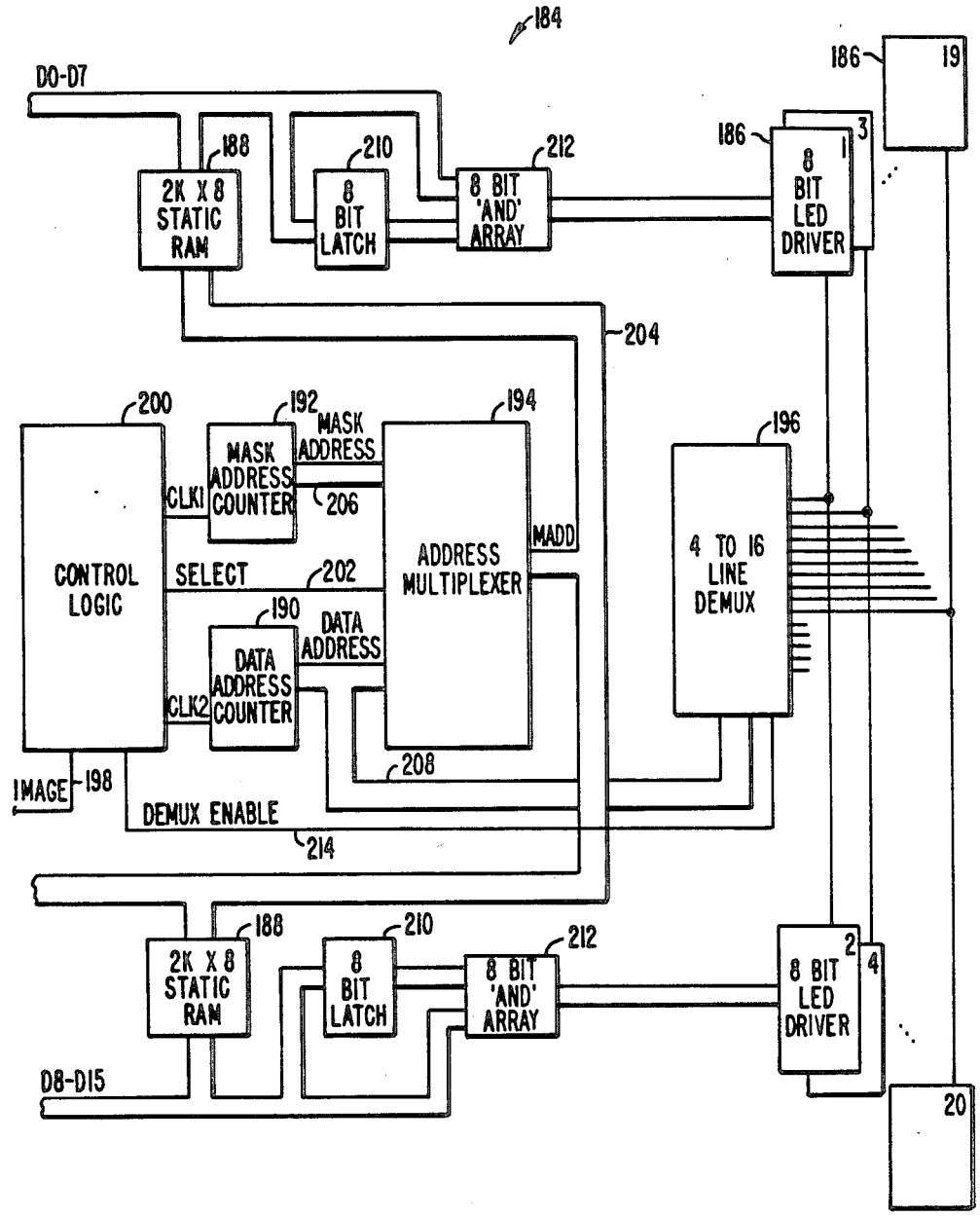
FIG_6C.

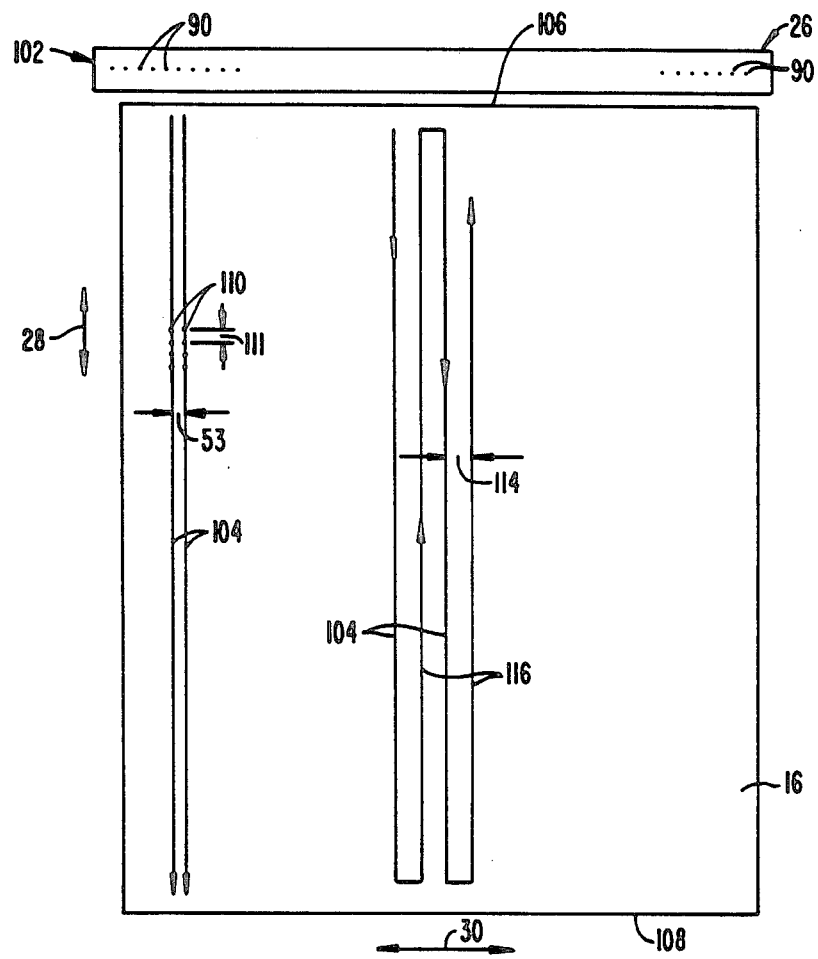
FIG.__7.
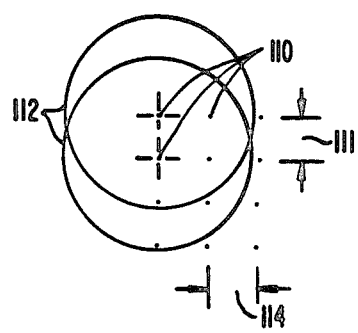
FIG.__8.

PHOTOPLOTTER MOUNTING HEAD ASSEMBLY

BACKGROUND OF THE INVENTION

Photoplotters are widely used to generate precision artwork for the creation of printed circuit boards. Two primary techniques are used in the design of current photoplotters. Calligraphic plotters draw with light on film much like pen plotters are used to draw with a pen on paper. Commonly, light from a quartz halogen lamp or a xenon flash tube is passed through one of a selectable set of apertures, focused on the film and moved by some sort of two axis orthogonal mechanism. Raster photoplotters employ a scanning technique similar to the way images are created by an electron beam on a cathode ray tube. With raster photoplotters, a laser light source is commonly focused onto a high-speed acousto-optic modulator which turns the beam on and off. The modulated beam is then imaged onto a rapidly rotating polygonal mirror which scans the beam across the face of a light sensitive film. The film moves perpendicularly to the modulated beam. The plot is imaged line by line as a series of dots.

The presently used techniques have advantages and disadvantages. Raster photoplotters are relatively quick (30 seconds to 3 minutes per page). The plot time is independent of image density. However, the costs to build, test and service these raster photoplotters make them quite expensive. Calligraphic plotters, on the other hand, exhibit plot times directly proportional to the density of the plotted image. For a densely imaged plot, plot times can exceed several hours. However, calligraphic plotters, although not inexpensive, are substantially cheaper than raster plotters.

SUMMARY OF THE INVENTION

The present invention is directed to a mounting head assembly used with a raster type photoplotter having a series of spaced-apart light sources, typically LED's. The assembly includes an elongate mounting head (also called a light head when used with LED's) having a datum surface extending along its length. The datum surface faces the bed of the photoplotter. A series of bores are formed in the mounting head at spaced-apart positions along the length. The bores extend from the datum surface and into the mounting head.

The bores each have a lens-receiving portion sized to accept a lens and a light source receiving portion for receipt of an LED. The bores preferably include a narrowed aperture between the LED and lens. The lenses are all secured within their respective bores so that the focal points for all the lenses are the same distance from the datum surface.

Preferably, the lenses are of a type in which the index of refraction varies radially, typically parabolically. This type of lens is often cylindrical in shape and may have flat ends. The lenses are preferably mounted with their outer surfaces coplanar with the datum surface. This allows the lenses all to be easily but effectively mounted with great precision relative to the datum surface. Such coplanar mounting is especially suited when the lenses are rod lenses with a flat outer surface.

The lenses, especially when rod lenses are used, are preferably secured within their bores by resiliently biasing the lenses against the sides of their bores. This is preferably accomplished by forming a groove along the length of the light head parallel to the datum surface. The groove intersects the bores at positions adjacent the lenses. A resilient member, such as an elongate cushion ring, is mounted within the slot. The cushion ring is biased against the sides of the lenses. The surface friction between the lens and the bore and between the lens and the cushion ring keeps the lens from moving within the bore thus maintaining the outer surface of the lens at a set position with respect to the datum surface, preferably coplanar with the datum surface. In this manner the lenses are securely but simply retained in their proper positions within their bores. If desired the lens and light source could be combined in a single unit; in such case the combination lens and light source would be secured in the bore in a manner similar to the separate lens.

This simple but secure mounting of the lenses in the mounting head is aided by the low accelerations to which the mounting head is subjected. The low accelerations are a result of the use of a serpentine columnar addressing system in which the row of LED's move along the entire length of the printing medium in a columnar direction. The columnar direction is perpendicular to the row of LED's. After each pass the mounting head is indexed a short distance perpendicular to the columnar direction and the process is repeated.

Other features and advantages of the present invention will appear from the following description in which the preferred embodiment has been set forth in detail in conjunction with the accompanying drawings.

BRIEF DESCRIPTION OF THE DRAWINGS

FIG. 1 is a perspective view of a photoplotter made according to the invention with portions of the cabinet removed for clarity.

FIGS. 2A and 2B are perspective views taken along lines 2A—2A and 2B—2B of FIG. 1.

FIG. 2C is a partial cross-sectional view taken along line 2C—2C of FIG. 2A.

FIG. 3A is an exploded isometric view of the light head of the photoplotter of FIG. 1.

FIG. 3B is an enlarged cross-sectional view of the light head.

FIG. 3C is an enlarged cross-sectional view of an alternative embodiment of the light head of FIG. 3B.

FIG. 4 is a schematic representation showing a test strip having multiple photosensitive elements in relation to the light head for use in the control of the intensity of the various light sources carried by the light head.

FIG. 5 is a schematic diagram of various operational elements of the photoplotter of FIG. 1.

FIGS. 6A and 6B are simplified traces of an LED actuation signal and a broken actuation signal respectively.

FIG. 6C is a simplified block diagram of the LED intensity control circuitry.

FIG. 6D is a simplified trace of the broken LED actuation signal of FIG. 6B in which the energization period has been increased to permit gray tone images.

FIG. 7 is a simplified diagram illustrating the placement and movement of the light sources of the photoplotter of FIG. 1 over a printing medium.

FIG. 8 illustrates the interposition distance between columnar positions in the same column, the distance between corresponding columnar positions in adjacent columns and the overlap of adjacent light spots.

DETAILED DESCRIPTION OF THE PREFERRED EMBODIMENT

Overall Construction

Turning now to FIG. 1., photoplotter 2 will be described with reference to the overall machine construction. Photoplotter 2 includes a film bed 4 mounted to a frame 6 within a light-proof housing 8. Film bed 4 has a number of vacuum grooves 10 formed along its upper surface 12, grooves 10 being connected to a vacuum source 14. A partial vacuum within grooves 10 help keeps the printing medium, typically light sensitive film 16, flat on surface 12 of bed 4. It should be noted that although photoplotter 2 is shown with a stationary, flat film bed 4, with appropriate modification bed 4 could be in a different shape, for example cylindrical, or the film or the film bed could be moved.

Photoplotter 2 includes a carriage assembly 18 mounted to and moving along the lateral edges 20 of film bed 4 through pairs of grooved support rollers 22 which engage rods 23 secured to edges 20. Carriage assembly 18 supports a light head assembly 24 over bed 4. Assembly 24 includes a light head 26 within which numerous light sources, discussed in more detail below, are mounted. In this application light head 26 will be considered to be mounted over bed 4 even if upper surface 12 of bed 4 is not horizontal or if upper surface 12 actually faces downwardly. Appropriate control electronic components, not shown, are mounted beneath base 4 and are cooled by a pair of fans 27.

Briefly, an image is produced on light sensitive film 16 by moving carriage assembly 18 along the X-axis 28 by a computer-controlled X-axis stepper motor 29 while the various light sources 90. including LED's 60 and lenses 68 (see FIG. 3B) or lenses 68, 69 (see FIG. 3C), are illuminated at appropriate positions over film 16. Carriage assembly 18 is driven along X-axis 28, that is along the columnar direction, by X-axis stepper motor 29 through a traction drive 32 (see FIG. 2B) which engages a drive bar 34 secured at either end to the end plates 36 of frame 6. Other drivers, such as a lead screw, belt drive or similar apparatus, could be used instead of traction drive 32.

The X-axis position of carriage assembly is monitored by a linear encoder 31 such as sold by Teledyne Gurley of Troy, N.Y. as Model 8745 (see FIGS. 2A and 2B). Encoder 31 includes an encoded bar 33 mounted at either end to frame 6 parallel to X-axis 28 and a sensor 35 secured to assembly 18 and positioned adjacent bar 33. The signals from encoder 31 act to gate the illumination signals to light sources 90 so the light sources are illuminated at proper X-axis positions.

At the end of each pass along the X-axis, light head assembly 24 is indexed a short distance along the Y-axis 30 by actuating the Y-axis actuator 115. Carriage assembly 18 reverses direction along X-axis 28 and moves back over film 16 and film bed 4 in the reverse columnar direction. Light sources 90 are again illuminated at appropriate positions to create the desired image on film 16. The process is repeated until the entire image area of film 16 has been passed over by light sources 90 in light head assembly 24.

Light head assembly 24 is accurately positioned above film 16 on bed 4 by a pair of z-axis stepper motors 38. Motors 38 are used to raise and lower carriage assembly 18 and light head assembly 24 therewith along the z-axis 40.

Light Head 26

Referring now also to FIGS. 3A and 3B, light head 26 is secured at its ends 42, 44 to mounting blocks 46. Light head 26 includes a series of bores 48 formed completely through head 26 and extending from a datum surface 50 to an opposite surface 52. Bores 48 are formed in a straight line at an identical chosen common interval 53. Interval 53, in this preferred embodiment, is equal to 0.1 inch or 2.54 mm. In the preferred embodiment 160 separate bores 48 are formed in light head 26 for a total image area width of 16 inches or 40.6 centimeters.

Bore 48 includes a lens receiving portion 54 adjacent datum surface 50 and a light source receiving portion 56 adjacent opposite surface 52. Portions 54, 56 are coupled by a narrowed aperture 58 therebetween. An LED 60 is mounted within portion 56. LED 60 is connected to a printed circuit board 62 through its leads 64, board 62 being mounted against surface 52. LED 60 is fully and securely positioned within portion 56 through the use of a spongy material 66 between LED 60 and board 62.

A generally cylindrical rod lens 68 is mounted within lens receiving portion 54 of each bore 48. Outer surface 70 of lens 68 is preferably coplanar with datum surface 50. Lens 68 is of a type in which the index of refraction varies according to radial position. This characteristic allows lens 68 to have flat surfaces at either end and still cause the light to converge at a focal point 72. Lens 68 is of the type sold under the trademark SELFOC by NSG of America of Somerset, N.J.. By using this type of lens and positioning its outer surface 70 coplanar with datum surface 50, focal points 72 will be the same distance from datum surface 50 for uniformity of focus. This construction also allows a desired height above film 16 to be easily and quickly obtained for different thicknesses of film 16.

To obtain the desired height, the user actuates z-axis stepper motors 38 until datum surface 50 touches bed 4. Light head assembly 24 is then raised along z-axis 40 by stepper motors 38 a desired distance above bed 4 with an appropriate distance added to account for the thickness of film 16. Alternatively, light head assembly 24 could be lowered to touch film 16 on bed 4 and then raised an appropriate distance. This is preferably done virtually automatically under control of a computer 88 (see FIG. 5) as part of an initiation sequence.

Another deceptively important feature of light head 26 is the means by which lenses 68 are secured within bores 48. To do so, a slot 76 is formed along the length of light head 26 sufficiently deep so that slot 76 intersects lens receiving portions 54 of bores 48 a short distance. Lenses 68 are properly positioned within bores 48 when outer surfaces 70 are coplanar with datum surface 50. A resilient cushion ring 78 is positioned within slot 76 and is secured there by an L-bracket 80. L-bracket 80 is secured along its length to light head 26 by screws 82. Cushion ring 78 is biased against the sides of lenses 68 by L-bracket 80 to gently but securely maintain lenses 68 within bores 48 simply and without shifting. Ring 78 is preferably made from a material, such as NBR, silicone or other rubberized material, which has a high friction outer surface so to help keep lenses 68 from shifting in bores 48. This arrangement permits the simple but accurate placement and securement of lenses 68 with respect to datum surface 50.

Referring now to FIG. 3C an alternative embodiment of light head 26 is shown. Light head 26' is similar to light head 26 and like numerals designate like elements. Light head 26' includes a top half 226 and a bottom half 228 separated by an aperture mask 230 defining apertures 58' therein. Top half 226 and bottom half 228 are shown spaced apart to more clearly show mask 230. Portion 56' is longer than portion 56 and houses a rod lens 69 as well as LED 60. Other lens combinations and configurations for the light head are also possible.

Intensity Control

Commercially available LED's 60 do not produce light of equal intensities for the same input. However, in most circumstances photoplotter 2 needs to have the light intensity of each LED 60 to be equalized to produce a proper image on film 16, or other media sensitive to electromagnetic radiation. Rather than attempting to modify the level of the input signal to each LED, a brightness equalization routine is initially conducted, typically at the factory. This routine involves the use of a test element 84 (see FIG. 4) supported beneath light head 26 for movement parallel to light head 26. Test element 84 is connected to computer 88 (see FIG. 5). which controls the functions of photoplotter 2. Once light head 26 is properly positioned over test element 84, LED's 60 are illuminated one at a time so to shine on element 84 as element 84 is positioned beneath each LED 60. The output from element 84 for each LED 60 is stored in permanent memory in computer 88 for use in equalizing the intensity of the light emanating from light sources 90 (see FIG. 3B). This information from test strip 84 is used by computer 88 in the following manner.

Referring now to FIGS. 6A and 6B, an LED actuation signal 92 is shown as a square wave. The energization level 94 is coextensive with the energization period 96. However, as shown in 6B, the energization period 96 for LED's 60 can be broken into a leading segment 98 and a trailing segment 100, during which LED 60 is energized, and an intermediate segment 101, during which the LED 60 is not energized. Thus, the light sources 90 with the lowest or smallest output, as measured by test strip 84, may be supplied a continuous LED actuation signal 92 during the entire energization period 94 as shown in FIG. 6A during use in creating an image on film 16. However, the light sources 90 which have been measured by test strip 84 to produce greater outputs are provided a broken signal 97 (see FIG. 6B) and therefore are energized during leading and trailing segments 98, 100 of period 96. The duration of segments 98, 100 are chosen according to the light intensity values stored in computer 88 from test element 84.

For example, the output from the light source 90 having the lowest output as measured by test element 84 can be considered the standard or base output. Outputs from light sources 90 which are greater are combined by computer 88 in the form of a fraction with the smaller output value being divided by the larger output to form a fraction. This fraction corresponds to the fraction created by dividing segments 98 and 100 by period 96. Assume the light intensity value for the LED 60 having the lowest output is 6 units and the intensity value for another LED 60 is 8 units. The fraction would be 6÷8 or ¾ so that the intermediate segment 101 would be ¼ of period 96 while leading and trailing segments 98, 100 would total ¾ of period 96.

It has been found to be preferable to modify the duration of the illumination of light sources 90 in the manner shown in FIG. 6B, rather than simply illuminating the LED for one continuous but shortened illumination segment. A single but shortened energization period can create images in which edges parallel to Y-axis 30 (that is parallel to light head 26) are poorly defined or staircased. This occurs because light head 26 moves constantly along X-axis 28 so that the region of film 16 illuminated by light sources 90 depends in part on when during period 96 the LED is illuminated. Therefore, if the illumination of two adjacent LED's 60 is started or stopped at slightly different times during period 96, image edges parallel or generally parallel to light head 26 will not be even since one one LED would start and/or stop before the other.

In the preferred embodiment period 96, which is typically one millisecond in length, is broken up into 100 subsegments by computer 88. A greater or a lesser number of segments could be used if desired. Some sacrifice of intensity adjustment will occur when fewer segments are used. Also, it is possible that in addition to the leading and trailing segments 98, 100, one or more intermediate energization segments, not shown, could be used as well. However, it has not been found to be necessary to provide such intermediate segments with the preferred embodiment. Segments 98, 100 could be of different durations as well.

Referring now to FIG. 6C, a simplified block diagram illustrating LED intensity control circuitry 184, a part of computer 88, is shown. Broadly, circuitry 184 includes twenty 8-bit LED drivers 186 to accommodate the 160 LEDs 60 on row 102, two static rams 188, a data address counter 190, a mask address counter 192, address multiplexer 194 connected to the two counters 190, 192, a four line to sixteen line demultiplexer 196, and associated circuitries.

Static rams 188 contain both plot data, generated by computer 88 during the plot, and light source intensity equalizing mask data, computed initially using test element 84 and stored permanently in rams 188. The first ten words in ram 188 contains the image data for one row. The remaining 2,038 words are available for mask data storage. Assuming, as discussed above, each energization period 96 is divided into 100 subsegments, the intensity mask for each LED consists of 100 bits. The bits representing leading and trailing segments 98, 100 will be logic high while the bits representing intermediate segment 101 will be logic low. Assume that intermediate segment 101 for a particular light source 90 has been determined, by testing, to be 20% of energization period 96. In this case, leading and trailing segments would each be 40% of period 96. Assuming that period 96 is broken up into 100 subsegments, 40 bits representing leading and trailing segments 98, 100 would each be set at logic high and the 20 bits representing intermediate segment 101 would be set at logic low. This set of the logic high and low bits for the leading, trailing and intermediate segments, determined separately for each light source 90, acts as a mask in the manner discussed below.

During operation the CPU (not shown) of computer 88 writes a row of image data (that is, information whether or not each light source 90 will be illuminated at that particular row) into static rams 188. The CPU then initiates the image cycle by asserting an image signal on image line 198 to control logic 200. Control logic 200 then initializes data address counter 190 to address 0, initializes mask address counter 192 to address 10 and sets a select line 202 (which connects control logic 200 with address multiplexer 194) at logic high. When select line 202 is at logic high, the multiplexed address (MADD) provided on a line 204 (which connects address multiplexer 194 to the address bus of rams 188) by address multiplexer 194 is the data address. The data address is provided to address multiplexer 194 along data address line 208. When select line 202 is logic low, address multiplexer 194 provides line 204 with the mask address provided from mask address counter 192 along mask address line 206.

While select line 202 remains at logic high the first word (16 bits) of image data is read from rams 188 (8 bits from each ram) and latched into associated 8-bit latches 210. Thereafter, select line 202 is set to logic low which gates the mask address (initially address 10) to static rams 188. The 16-bit mask value for the first sixteen subsections if energization period 96 is anded at 212 (8 bits for each AND 212) with the previously stored image data in latches 210. The result is written to the first pair of LED drivers 186, identified as 1 and 2 in FIG. 6C, by actuating demultiplexer 196 through demux enable line 214 (which connects control logic 200 to demultiplexer 196). As a result of this, any LED for which a logic high is stored in both the data location (that is, that position over film 16 which is to be illuminated) and the corresponding mask location (that is, that a particular subsegment along energization period 96 which is within either leading segment 98 or trailing segment 100) in ram 188 will be turned on for that subsubsegment of energization period 96. If either or both of the data or mask is logic low, then the LED will not be turned on for that subsegment of period 96.

Thereafter, select line 202 is reset to a logic high, data and mask address counters 190, 192 are incremented, setting them to addresses of 1 and 11, respectively. The above-steps, starting with reading the image data from rams 188, are repeated until data address counter 190 reaches 9 and mask address counter reaches 19. After this occurs, data address counters 190 is reset to 0 while mask address counter is incremented to 20. This process repeats for each position of light head assembly 24 along X-axis 28.

Turning now to FIG. 6D, a broken signal 97' is shown illustrating result of a global intensity modification or trim. The duty cycle of the energization period 96 is defined as the ratio of the length of the energization period 96 to the length 99 between the start of energization periods. Note that in FIG. 6B and 6D lengths 99 and 99' are the same lengths. However energization period 96' is longer than period 96, thus indicating a longer duty cycle. Therefore, global intensity modification can be accomplished by simply changing the duty cycle; this leaves the relative percentage of "on" time for each LED 60 the same, but simply increases or decreases the energization period for all the LEDs. This can be accomplished by rewriting the mask data in rams 188.

Changing the duty cycle can be done for each LED 60 at columnar position 110. This would allow the creation of a gray scale plotter. In such a case the image data could be represented by a multi-bit word designating whether the particular LED 60 will be maximum brightness, not illuminated or somewhere between. This gray scale information could then be combined with the basic mask information re-written row-by-row into rams 188.

In the preferred embodiment rams 188 are physically located as a part of light head assembly 24. Since the mask data for each assembly 24 remains with such light head assembly 24, even in the absence of power, light head assemblies 24 can be exchanged among photoplotters 2. Also, a light head assembly 24 can be returned to the factory for repair or for recalculation of the mask data if the relative intensities of the various LEDs has changed over time.

Columnar Addressing

FIG. 7 shows a simplified representation of a row 102 of light sources 90 mounted over film 16. Film 16 has an image area width, parallel to Y-axis 30, of about 16 inches (40.64 cm) and an image area length, parallel to X-axis 28, of about 20 inches (50.8 cm). Light sources 90 are moved parallel to X-axis 28 along columns 104 from one end 106 of film 16 to another end 108 of film 16 through traction drive 32. Columns 104 are divided into numerous columnar positions 110 each, in the preferred embodiment, having an interposition distance 111 of 0.001 inch or 0.0254 mm. See FIG. 8. When row 102 of light sources 90 are at a set of columnar positions 110, computer 88 actuates the appropriate ones of light sources 90 to illuminate the underlying positions 110 on film 16. Although the columnar positions 110 are 0.0254 mm apart, the diameter of light spots 112 from light sources 90 are preferably about five times greater than that distance so that the individual light spots 112 overlap substantially. This results in the image edges being relatively smooth.

Once row 102 of light sources 90 reaches the end of columns 104 adjacent another end 108 of film 16, light head 26, and thus row 102, indexes in a direction parallel to Y-axis 30 (to the right in FIG. 7) an index distance 114. This movement is illustrated in FIG. 7 on a greatly expanded horizontal scale. Index distance 114 is, in this preferred embodiment, equal to the distance between columnar positions 110, that is 0.0254 mm. After indexing, which is accomplished by the actuation of Y-axis stepper motor 115, X-axis stepper motor 29, through traction drive 32, moves row 102 parallel to X-axis 28 back towards one end 106 of film 16 while computer 88 illuminates light sources 90 at the appropriate columnar positions 110 along reverse columns 116. Since index distance 114 is 1/100 of the chosen common interval 53 between light sources 90, after fifty complete cycles (100 passes) of carriage assembly 18, the entire image plot on film 16 will be accomplished. For many plots one or more of light sources 90 will not be illuminated during one or more of passes along columns 104 and reverse columns 116.

Modification and variation can be made to the disclosed embodiment without departing from the subject of the invention as defined in the following claims. For example, instead of using stationary bed 4 and a movable light head 26, the bed could be moved and the light head could be stationary. Also, both could be made to move. The preferred embodiment has been discussed in terms of light sensitive film used for printed circuits. The photoplotter of the invention could be used for many other types of images to be produced using media sensitive to other types of electromagnetic radiation, such as X-rays. If desired, the invention could be adapted to make color prints, such as by providing a set of carriage assemblies 18 each with its own set of light sources 90 corresponding to the three primary colors.

What is claimed is:

1. A mounting head assembly, of the type for use with a raster-type photoplotter using a series of spaced-apart light sources, the assembly comprising:
    an elongate mounting head having a length and a datum surface extending along the length;
    the light sources each including a lens and an illumination element, each lens including at least one lens element;
    the elongate head having a series of bores formed in the mounting head at positions along the length, the bores extending from the datum surface into the mounting head, the bores having lens receiving portions for receipt of the lenses, the bores also having illumination element receiving portions for receipt of the illumination elements, the illumination elements and lenses being mounted within the respective receiving portions of the bores in the mounting head;
    the mounting head including a slot formed therein, the slot positioned and sized to intersect the lens receiving portions of the bores; and
    means for securing the lenses in the bores at chosen positions with respect to the datum surface, the securing means including an elongate resilient member positioned within the slot to engage the sides of the lens elements, and means for biasing the resilient member against the sides of the lens elements, each of the resilient members having a high friction outer surface for inhibiting movement of the lens elements in the bores.

2. The mounting head assembly of claim 1 wherein the illumination elements include LED's.

3. The mounting head assembly of claim 1 wherein the resilient member biasing means includes an angle bracket and threaded means for mounting the angle bracket to the mounting head.

4. The mounting head assembly of claim 1 wherein the lenses each have a surface aligned with the datum surface.

5. The mounting head assembly of claim 1 wherein the lenses are of the type in which the index of refraction varies radially.

6. The mounting head assembly of claim 1 wherein each bore has a narrowed aperture between the light source and the lens.

7. The mounting head assembly of claim 1 wherein the light sources are LED's.

8. The mounting head assembly of claim 7 wherein the LED's are mounted to a circuit board with a resilient pad between the LED's and the circuit board.

9. The mounting head assembly of claim 1 wherein each lens includes first and second lens elements.

10. A mounting head assembly, of the type for use with a raster-type photoplotter using a series of equally spaced light sources, the assembly comprising:
    an elongate mounting head having a length and a datum surface extending along the length;
    the light sources each including a lens and an LED, the lens having an outer surface;
    the mounting head having a series of bores formed in the mounting head at positions along the length, the bores extending from the datum surface into the mounting head, the bores having lens receiving portions within which the lenses are housed, the bores also having LED receiving portions within which the LED's are housed;
    the mounting head including a slot formed therein, the slot sized and positioned to intersect the lens receiving portions of the bores; and
    means for securing the lenses in the bores so the outer surfaces of the lenses are generally aligned with the datum surface, the securing means including:
    an elongate resilient member positioned within the slot to engage the sides of the lenses, and
    means for biasing the resilient member against the sides of the lenses, the resilient member having a high friction outer surface to inhibit movement of the lenses within the bores.

* * * * *